3,413,134
OXIDATION RESISTANT REFRACTORY
COMPOUNDS
Lawrence P. Kaufman, Brookline, and Edward V.
Clougherty, West Roxbury, Mass., assignors to
Manlabs, Inc., Cambridge, Mass., a corporation
of Massachusetts
No Drawing. Continuation-in-part of application 456,837,
May 18, 1965, which is a continuation-in-part of application Ser. No. 414,415, Nov. 27, 1964. This application Jan. 26, 1968, Ser. No. 700,755
5 Claims. (Cl. 106—55)

ABSTRACT OF THE DISCLOSURE

Refractory binary solid state compounds of several transition elements in Groups IV, V and VI of the periodic table are described having an excess relative to whole number atomic proportions of that component which forms the least volatile oxide at elevated temperatures.

---

This invention relates to improving the oxidation resistance of refractory binary solid state compounds at elevated temperatures. This application is a continuation-in-part of our copending allowed application Ser. No. 456,837 filed May 18, 1965, now abandoned, which in turn is a continuation-in-part of our earlier application Ser. No. 414,415 filed Nov. 27, 1964, now abandoned.

Background of the invention

While the pure refractory metals with melting points above 2000° C., such as molybdenum, tantalum and tungsten, generally have satisfactory mechanical properties, they all oxidize catastrophically in air at elevated temperatures (that is, temperatures above 1200° C.). For structural applications, it has been necessary to investigate high melting compositions such as those of borides, silicides, carbides and aluminides, which exhibit better oxidation resistance. The borides and silicides of the transition elements in Groups IV, V and VI of the periodic table (Ti, Zr, Hf; V, Nb, Ta; Cr, Mo, W) have been found to be particularly attractive in this respect. Empirically, in fact, molybdenum disilicide and zirconium diboride, are among the most oxidation resistant materials heretofore known at high temperatures.

Summary of the invention

It is the principal object of this invention further to improve the oxidation resistance of refractory binary compounds at elevated temperatures.

Known oxidation resistant refractory binary compounds will form two oxides—AOx and BOy, upon being reacted with oxygen. In most cases, one of these oxides will be more volatile than the other at a given temperature. We have found that the oxidation resistance of such a compound can be significantly improved at high temperatures by forming the original compound to have a non-stoichiometric excess of the element which forms the less volatile oxide.

It is a further object of the invention to provide refractory binary compounds having a non-stoichiometric excess of one element such that the compound has improved oxidation resistance at elevated temperatures.

Description of the invention

As a general example illustrating the invention, it will be convenient to consider the compound hafnium diboride ($HfB_2$). The stoichiometry of this compound calls for two boron atoms for each hafnium atom:

$$Hf_{(1.0)}B_{(2.0)} \quad (A)$$

If the amount of boron is increased so that an excess of boron is present, the resulting compound is boron-rich; this can be done by adding powdered boron to powdered stoichiometric $HfB_2$ prior to hot pressing (as hereinafter described). If the amount of hafnium is in excess of the stoichiometric quantity, the resulting compound is metal-rich; in this case, powdered hafnium is the additive to stoichiometric $HfB_2$ prior to hot pressing. We have made a boron-rich compound in the ratio:

$$Hf_{(1.0)}B_{(2.1)} \quad (B)$$

and a metal-rich compound in the ratio:

$$Hf_{(1.0)}B_{(1.9)} \quad (C)$$

We found that, at 2000° C., the boron vapor pressure of (B) was about 40 times greater than the boron vapor pressure of (A) but that the boron vapor pressure of (C) was only about $\frac{1}{40}$ as great as the boron pressure of (A). This indicates that the vapor pressure at high temperature of either component of a binary compound can be decreased by making the compound with an excess (relative to stoichiometry, or whole-number atomic proportions) of the other component. The non-stoichiometric ratios given above approximate the compositional limits of the single phase field for this compound; that is, they define a range throughout which the crystal structure of $HfB_2$ is identical. The boron to metal ratio of (B) is B/Me=2.10; the boron to metal ratio of (C) is 1.90; the stoichiometric ratio is, obviously, B/Me=2.0. Preferably, the non-stoichiometric ratio used for any compound should be limited to maintain a microstructure which is at least 95 volume percent single phase for that compound.

We have verified experimentally that the oxidation of $HfB_2$, $ZrB_2$, $TiB_2$ and $TaB_2$ proceed according to the parabolic rate law:

$$W^2 = Kppt \quad \text{(Relation)}$$

where:

$W$=weight of oxygen taken up per square cm. of the sample (g./cm.$^2$);
$t$=time (minutes); and
$Kpp$=the parabolic rate constant for a given material at a given temperature (g.$^2$/cm.$^4$-min.).

We have found also that the ambient gas (oxygen) pressure has only a second order effect. In our experiments, to be illustrated by example set forth below, we have achieved marked reductions in the value of $Kpp$, in non-stoichiometric compounds according to the invention, as compared with the value of $Kpp$ for the same compound in stoichiometric proportions, under the same conditions of temperature and pressure.

We have made refractory bodies of test materials by bonding together, as for example, by high pressure hot pressing, powders of the compound. For test purposes, we made cylindrical sample pellets, approximateyl 0.8 cm. in diameter and 0.3 cm. thick, which were then degassed in helium at about 1900° K. until evolution of permanent gases stopped. The degassed pellet was then inductively heated in a helium-oxygen mixture flowing at about 3 cm./sec. in the neighborhood of the sample. The rate of oxygen consumption was monitored continuously by means of a thermal conductivity bridge that compared the oxygen concentration in the gas stream before and after reaction. The sample and the helium-oxygen mixture were contained in a thermal conductivity cell. The parabolic rate constant $Kpp$ for a given sample temperature was arrived at in terms of total oxygen consumption at that temperature; i.e.: the amount of oxygen in all of the product oxides, volatile and non-volatile. This total oxygen consumption, divided by the surface area of the sample, is $w$ in Relation 1. A plot in Cartesian coordinates of $w^2$ vs. $t$ was found to be a straight line over a long period of time (e.g.: 6 hours for $HfB_2$ at 1758° K. and pressure 40.7 torr. oxygen in helium), illustrating that the parabolic rate law holds over an extended period of time.

We have made samples of boron-rich, stoichiometric, and metal-rich hafnium diboride, and measured $Kpp$ at 1900° K. for each sample, as follows:

CHART I.—VALUES OF $Kpp$ FOR $HfB^2$ AT 1,900° K.

| Sample made from— | Kpp |
| --- | --- |
| (a) Powder with B/Me=2.12 | $1.6 \times 10^{-4}$ |
| (b) Powder (a) + Hf sufficient to make B/Me= 2.00 | $5 \times 10^{-5}$ |
| (c) Powder (a) plus Hf sufficient to make B/Me= 2.70 | $5 \times 10^{-6}$ |

We have measured oxygen consumption with respect to time, and calculated $Kpp$ from Relation 1, for samples of both metal-rich and boron-rich $HfB_2$ at various temperatures, with results as follows:

CHART II

| Temp., ° K. | Kpp for— | |
| --- | --- | --- |
| | B/Me=1.88 | B/Me=2.12 |
| 1,330 | $4 \times 10^{-9}$ | $8 \times 10^{-9}$ |
| 1,550 | $1 \times 10^{-7}$ | $3.2 \times 10^{-7}$ |
| 1,800 | $1 \times 10^{-6}$ | $4 \times 10^{-5}$ |
| 1,850 | $1.6 \times 10^{-6}$ | $1 \times 10^{-5}$ |

The symbol "B/Me" means the boron to metal ratio.

We have measured the oxygen consumption with respect to time, and calculated $Kpp$ from Relation 1, for samples of both metal-rich and boron-rich zirconium diboride ($ZrB_2$) at various temperatures, with results as follows:

CHART III

| Temp., ° K. | Kpp for— | |
| --- | --- | --- |
| | B/Me=1.89 | B/Me=2.1 |
| 1,330 | $8 \times 10^{-9}$ | $3.2 \times 10^{-8}$ |
| 1,550 | $4 \times 10^{-7}$ | $1 \times 10^{-6}$ |
| 1,800 | $3.2 \times 10^{-5}$ | $3.2 \times 10^{-4}$ |
| 1,900 | $1 \times 10^{-4}$ | $1 \times 10^{-3}$ |

Additional examples were demonstrated by testing two hafnium boron compositions, a metal rich sample with B/Hf=1.70, and a boron-rich sample with B/Hf=2.12, by oxidation in air at 1910° K. These samples were prepared by hot pressing as in the earlier examples, and were tested in an apparatus consisting of a carbon tube with a four inch inside diameter forty two inches long which was heated by a high current low voltage supply. A zirconia tube which is ¾ inch inside diameter and one inch outside diameter and twenty four inches long is inserted coaxially. Argon gas is passed continuously through the annular space between the tubes while air is passed through the inner tube at a rate of 1000 cm.³/min. or 5 cm./sec. The specimens which are 300 mil. diameter disks 100 to 300 mils high are set on two zirconia pads spaced 250 mils apart to support the edges of the disks, and then put inside the tube.

The temperature of the furnace is measured by means of a platinum-rhodium thermocouple up to 1600° C. and optically at higher temperatures. The air flow rate can be readily increased to 20,000 cm.³/min. Temperature variations of less than ±10° C. are experienced during extended operation at 2000° C. and multiple specimen runs can be readily performed.

These samples were held for 4 hours at 1910° K. before the air flow was shut off. Subsequently the samples were sectioned metallographically and the diboride ($HfB_2$) to oxide ($HfO_2$) conversion depth was measured. There is a clean line of demarcation between the diboride body and the oxide layer, which facilitates this measurement. The B/Hf=1.70 sample showed a conversion depth of 0.0075 inch, whereas the B/Hf=2.12 sample showed a conversion depth of 0.0155 inches. The relation between the conversion depth $d$ in inches, the oxidation time $t$ in hours, and the parobolic rate constant $Kpp$ in units of grams $^2$/cm.$^4$-minutes is $$d^2 = \frac{1}{2} Kppt$$

or $$K_{pp} = \frac{2d^2}{t}$$

This relation yields values of $Kpp$ equal to $2.7 \times 10^{-5}$ gm.$^2$/cm.$^4$-minutes for the B/Hf=1.7 sample, and $Kpp = 1.2 \times 10^{-4}$ gm.$^2$/cm.$^4$-minutes for the B/Hf=2.12 sample, which indicates reasonable agreement with the values indicated in Chart I.

In the case of $HfB_2$, the oxidation products are $HfO_2$ and $B_2O_3$. In the case of $ZrB_2$ the oxidation products are $ZrO_2$ and $B_2O_3$. In each case $B_2O_3$ is the more volatile oxidation product in the temperature ranges shown in Charts II and III, and it was found that providing an excess over the stoichiometric amount of the element (i.e. the metal) which produced the less volatile oxidation product reduced the value of $kpp$ and rendered the compound more resistant to oxidation at elevated temperatures. The behavior illustrated is a consequence of the fact that the vapor pressure at any given temperature of the more volatile oxide of a binary compound of a refractory metal can be decreased by decreasing the vapor pressure in the original compound of the component which forms the more volatile oxide.

In the foregoing examples, oxidation resistance at elevated temperatures was achieved by making the compound metal-rich. The reverse is generally true of the silicides of Group VI (Cr, Mo, and W) of the periodic table. For example, tungsten disilicide ($WSi_2$) has the following oxidation products:

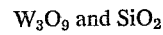

$W_3O_9$ and $SiO_2$

In the temperature range 1000° C. to 1400° C., $W_3O_9$ is more volatile than $SiO_2$. It is known that at high temperatures, and/or in vacuum, silicon vaporizes out of $WSi_2$ faster than tungsten; this is a natural depletion of silicon that can be predicted. According to the present invention one expects that a silicon-deficient, or metal-rich, compound of $WSi_2$ will oxidize more rapidly than a stoichiometric $WSi_2$. Thus, the natural depletion of silicon at high temperatures and/or low pressures will contribute to a silicon deficiency, and as a result an increased rate of oxidation (greater $Kpp$). We therefore require to decrease the vapor pressure of tungsten in the original compound, which is done by making the compound silicon-rich; a ratio Si/W=2.10 is useful, but other ratios which do not alter the crystal structure may be used. Thus, while an excess of silicon will increase the silicon vapor pressure in the compound, it will decrease the vapor pressure of the other component, tungsten, and will thereby decrease the vapor pressure of the more volatile oxidation product by decreasing the vapor pressure in the original compound of the component which forms the more volatile oxide. Similar considerations hold for other silicides of Group VI, such as $MoSi_2$, for example.

The carbides of hafnium, niobium, tantalum, zirconium and titanium are also made more oxidation resistant at high temperatures by making them metal-rich, like the diborides. In these cases, the oxidation products are:

| HfC | ZrC | NbC | TaC | TiC |
| --- | --- | --- | --- | --- |
| $HfO_2$ | $ZrO_2$ | $Nb_2O_5$ | $Ta_2O_5$ | $TiO_2$ |
| CO | CO | CO | CO | CO |
| $CO_2$ | $CO_2$ | $CO_2$ | $CO_2$ | $CO_2$ |

It is obvious that CO and $CO_2$ are the more volatile oxidation products in each case. The following non-stoichiometric metal-rich ratios will improve the oxidation resistance of these compounds:

| Metal-rich | Stoichiometric |
|---|---|
| $Hf_{(1.0)}C_{(0.9)}$ | $Hf_{(1.0)}C_{(1.0)}$ |
| $Zr_{(1.0)}C_{(0.9)}$ | $Zr_{(1.0)}C_{(1.0)}$ |
| $Ti_{(1.0)}C_{(0.5)}$ | $Ti_{(1.0)}C_{(1.0)}$ |
| $Ta_{(1.0)}C_{(0.9)}$ | $Ta_{(1.0)}C_{(1.0)}$ |
| $Nb_{(1.0)}C_{(0.8)}$ | $Nb_{(1.0)}C_{(1.0)}$ |

Titanium diboride ($TiB_2$) has oxidation products similar to those of hafnium diboride, viz:

$$TiO_2 \text{ and } B_2O_3$$

of which $B_2O_3$ is the more volatile. Oxidation resistance of this compound can be enhanced ($Kpp$ can be reduced in magnitude) by making the compound metal-rich. Similar considerations apply to tantalum diboride ($TaB_2$) and niobium diboride ($NbB_2$). In each case, only routine experimentation within the scope of the invention will be required to find an optimum non-stoichiometric ratio of components for the particular compound.

Molybdenum boride (MoB) is a stable compound over a wide temperature range. Its oxidation products are $$MoO_3 \text{ and } B_2O_3$$

of which $MoO_3$ is the more volatile over a wide temperature range. $B_2O_3$ is a solid at 700° C., while at the same temperature $MoO_3$ is a gas. Thus, since in this case $B_2O_3$ is the less volatile oxide, the compound should, according to the present invention, be made boron-rich, in order to decrease the vapor pressure in the original compound of the component which forms the more volatile oxide. A stoichiometric ratio of molybdenum boride is $$B/Mo = 1.00$$

From the molecular weights of the components (Mo=96; B=10.8), this yields $$\frac{10.8}{106.8} = 10.1 \text{ weight percent of boron}$$

The following boron-rich ratio would be in the single-phase field for this compound:

$$Mo_{(0.95)}B_{(1.00)}$$

The following metal-rich ratio would be in the single-phase field:

$$Mo_{(1.00)}B_{(0.95)}$$

The oxidation resistance at elevated temperatures of the boron-rich compound will be superior to that of the stoichiometric compound, or of the metal-rich compound. That is, $Kpp$ will be smaller for the boron-rich compound than for the stoichiometric compound or for the metal-rich compound.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

We claim:

1. A refractory binary solid state compound having improved oxidation resistance at elevated temperatures, the compound being hafnium boride, zirconium boride, titanium boride, niobium boride, tantalum boride, molybdenum silicide, tungsten silicide, hafnium carbide, zirconium carbide, titanium carbide, niobium carbide, tantalum carbide, or molybdenum boride, and having at least a 5% excess relative to the whole number atomic proportions for the compound of that component which forms the least volatile oxide, said excess being limited to maintain a microstructure which is at least 95 volume percent single phase for said compound, and wherein the closest whole number atomic proportion for each of said compounds is, respectively: two atoms of boron for each atom of hafnium, zirconium, titanium, niobium or tantalum; or two atoms of silicon for each atom of molybdenum or tungsten; or one atom of carbon for each atom of hafnium, zirconium, titanium, niobium or tantalum; or one atom of boron for each atom of molybdenum.

2. A refractory binary solid state compound having improved oxidation resistance at elevated temperatures, the compound being hafnium boride, zirconium boride, titanium boride, niobium boride or tantalum boride, and having at least a 5% excess relative to the whole number atomic proportions for the compound of that component which forms the least volatile oxide, said excess being limited to maintain a microstructure which is at least 95 volume percent single phase for said compound, and wherein the closest whole number atomic proportion for each of said compounds is two atoms of boron for each atom of hafnium, zirconium, titanium, niobium or tantalum.

3. A refractory binary solid state compound having improved oxidation resistance at elevated temperatures, the compound being molybdenum silicide or tungsten silicide, and having at least a 5% excess relative to the whole number atomic proportions for the compound of that component which forms the least volatile oxide, said excess being limited to maintain a microstructure which is at least 95 volume percent single phase for said compound, and wherein the closest whole number atomic proportion for each of said compounds is two atoms of silicon for each atom of molybdenum or tungsten.

4. A refractory binary solid state compound having improved oxidation resistance at elevated temperatures, the compound being hafnium carbide, zirconium carbide, titanium carbide, niobium carbide or tantalum carbide, and having at least a 5% excess relative to the whole number atomic proportions for the compound of that component which forms the least volatile oxide, said excess being limited to maintain a micro-structure which is at least 95 volume percent single phase for said compound, and wherein the closest whole number atomic proportion for each of said compounds is one atom of carbon for each atom of hafnium, zirconium, titanium, niobium or tantalum.

5. A refractory binary solid state compound of molybdenum boride having improved oxidation resistance at elevated temperatures, said compound having at least a 5% excess of boron relative to the whole number atomic proportions for the compound, said excess being limited to maintain a microstructure which is at least 95 volume percent single phase for said compound, and wherein the closest whole number atomic proportion for the two elements of said compounds is 1:1.

References Cited

UNITED STATES PATENTS

| 2,906,605 | 9/1959 | Dubeck | 23—204 |
| 3,056,658 | 10/1962 | Brennan et al. | 23—204 |
| 3,088,805 | 5/1963 | Cotter et al. | 23—204 |

OSCAR R. VERTIZ, *Primary Examiner.*

H. S. MILLER, *Assistant Examiner.*